United States Patent [19]

Baudenbacher

[11] Patent Number: 4,860,668

[45] Date of Patent: Aug. 29, 1989

[54] MOVEMENT-CONTROLLED LOCKING MECHANISM, PARTICULARLY FOR MOVABLE SUPPORT TABLES OR PLATFORMS

[75] Inventor: Christian Baudenbacher, Fideris, Switzerland

[73] Assignee: Visita Mtc Ltd., Chur, Switzerland

[21] Appl. No.: 183,043

[22] Filed: Apr. 19, 1988

[30] Foreign Application Priority Data

Apr. 21, 1987 [CH] Switzerland .................. 1532/87

[51] Int. Cl.⁴ .............................................. A47B 9/00
[52] U.S. Cl. ...................................... 108/144; 108/146
[58] Field of Search ............................... 108/144, 146; 292/DIG. 4; 312/312; 297/353; 248/297.3; 49/450

[56] References Cited

U.S. PATENT DOCUMENTS

| 2,378,852 | 6/1945 | James ............................ 108/146 X |
| 2,643,922 | 6/1953 | Rudman ........................... 108/146 |
| 3,217,672 | 11/1965 | Haughey .......................... 108/146 |
| 4,331,355 | 5/1982 | Okuno .......................... 292/DIG. 4 |
| 4,559,879 | 12/1985 | Hausser . | |
| 4,639,039 | 1/1987 | Donovan .......................... 297/353 |
| 4,749,230 | 6/1988 | Tornero .......................... 297/353 |

FOREIGN PATENT DOCUMENTS 2398207 7/1977 France .
319531 2/1957 Switzerland .

Primary Examiner—Peter A. Aschenbrenner
Attorney, Agent, or Firm—Frishauf, Holtz, Goodman & Woodward

[57] ABSTRACT

A table (11) can be stopped in a vertical movement with respect to a fixed guide (15) by selectively engaging an engagement and locking element (21) in form of a angled lever having a control arm (33) and a stopping and locking arm (31) with adjustment and stop elements (19) secured on the vertically extending second part (15). Upon movement from a predetermined position, the control arm (33) is engaged in a guide track (51) of the engagement and locking element, permitting unlimited movement in a direction away from an adjustment and stopping shoulder (37) on the abutment and stop element. Upon reverse direction, however, the control arm engages a first can (47) which moves the locking arm (31) against the abutment shoulder (37). To release the locking arm from the abutment shoulder, it is only necessary to make a short movement counter the locking direction which will engage the control arm in a second cam to release the lock, and the guide track (51) then guides the locking arm of the engagement and locking element clear of the adjustment and stopping shoulder upon again reversing direction of movement.

17 Claims, 4 Drawing Sheets

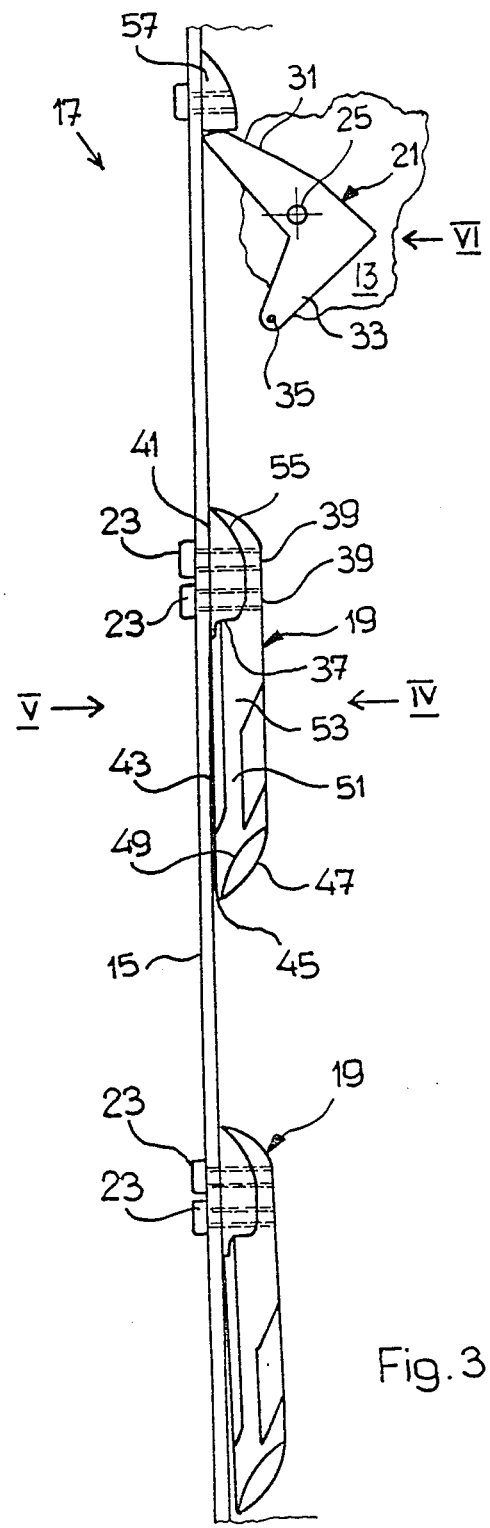

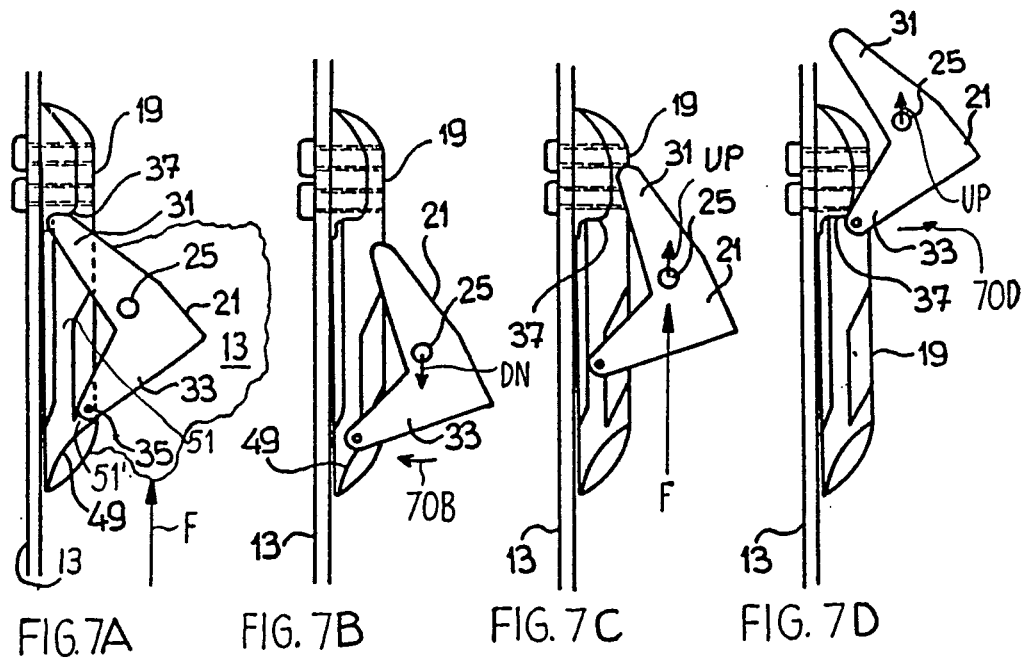
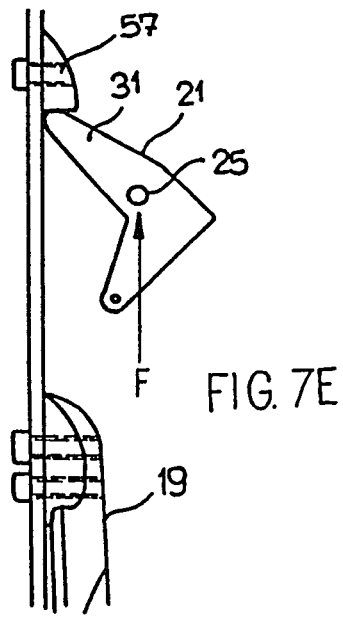

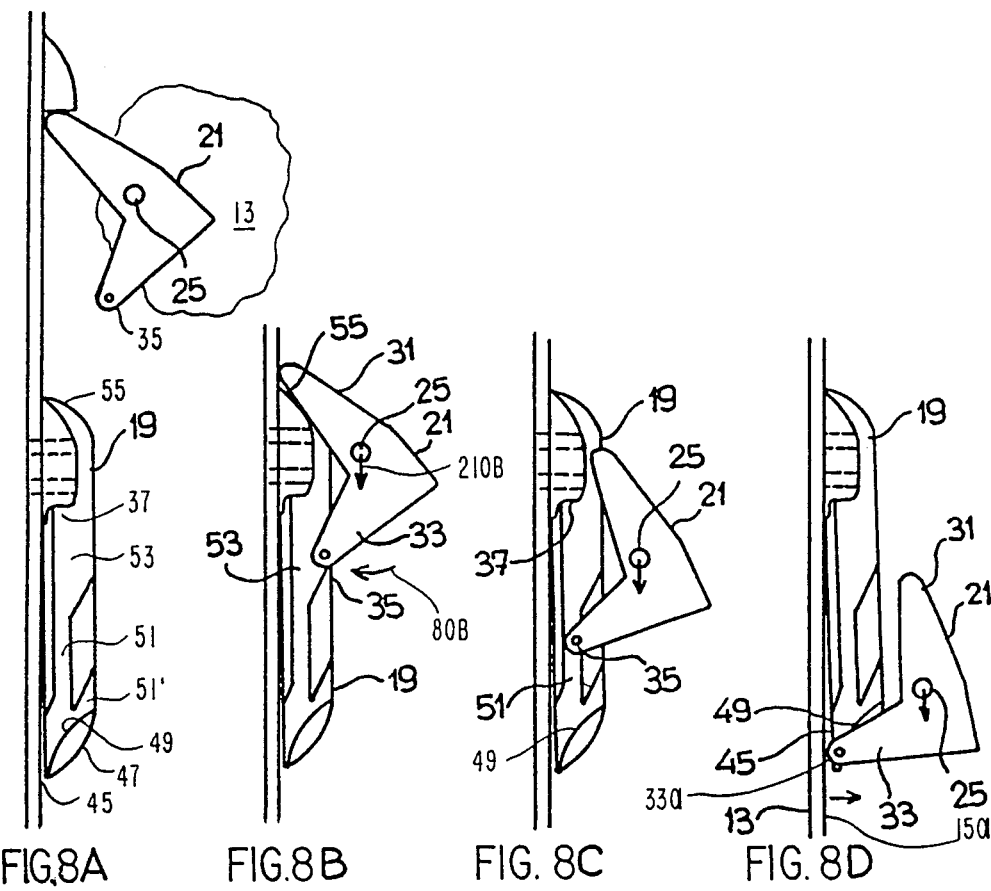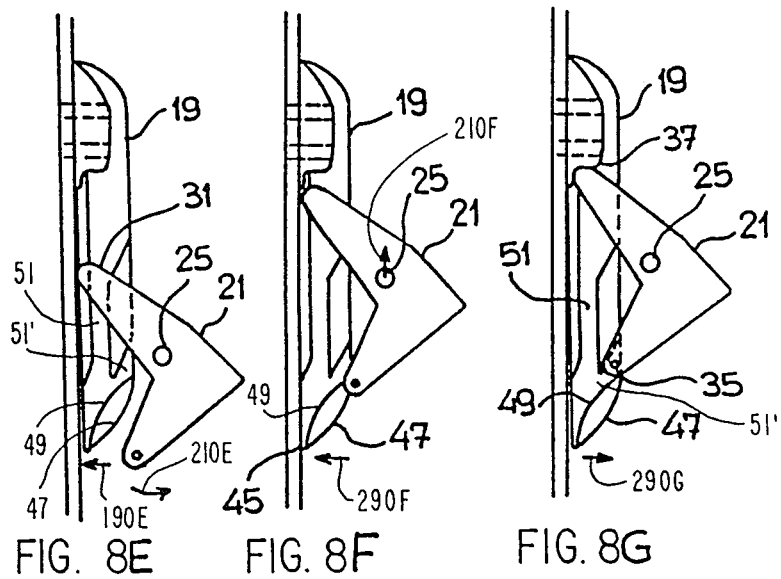
FIG.8A  FIG.8B  FIG.8C  FIG.8D
FIG.8E  FIG.8F  FIG.8G

MOVEMENT-CONTROLLED LOCKING MECHANISM, PARTICULARLY FOR MOVABLE SUPPORT TABLES OR PLATFORMS

Reference to related application, assigned to the assignee of the present application, the disclosure of which is hereby incorporated by reference:
U.S. Ser. No. 101,826, filed Sept. 23, 1987, SCHMELLER.

Reference to related patent, the disclosure of which is hereby incorporated by reference:
U.S. No. 4,559,879, HÄUSSER.

Reference to related disclosures:
Swiss Patent 319,531;
French Patent 2,398,207.

The present invention relates to apparatus to lock two movable parts in relatively locked position and permit unlocking by moving the parts relative to each other in an unlocking direction, and more particularly to a raising apparatus for platforms and the like in which a platform can be moved with respect to a support, and to lock the platform in position on the support while permitting unlocking by slightly raising the platform and thereby releasing the lock, to permit lowering the platform.

BACKGROUND.

Relatively lockable elements, and particularly platforms, tables and the like, are used frequently in the furniture industry and such raising and locking platforms or tables are used especially in connection with sewing machine tables. The referenced application Ser. No. 101,826, filed Sept. 23, 1987, SCHMELLER, the disclosure of which is hereby incorporated by reference, is directed to a typical application for the locking mechanism of the present application. Raising tables, surfaces or platforms may also be used in other applications, for example in kitchens, workplaces and the like, where depressed platforms can be used to retain appliances, such as bread cutting machines, food mixers and the like; or small tools, such as grinders, which are mounted on a platform. The platform can be lowered to an inoperative position, and a cover plate then placed thereover, to have a flat table. The mechanism to shift the platform on which the appliance is located usually includes a locking mechanism which is so constructed that the platform is locked in a predetermined position. Locking and unlocking the platform will depend on the type of locking mechanism used. For example lock mechanisms and positioning mechanisms which use springs to compensate the weight of the appliance and of the platform. Basically, two systems are in use:

(1) Mechanism with over-compensation: The spring is strong enough to raise the platform and the appliance thereon into an operating position. To lower the appliance, for example below a work or table surface, the appliance and the platform are depressed to overcome the spring force. This depression is carried out until the lock mechanism latches and the platform is then retained in a lower position.

(2) Undercompensation: The mechanism must provide a stop which limits the lower position of the platform, and further a latch at the upper position which prevents depression of the platform from the raised position.

Under conditions of overcompensation, the platform is raised by spring pressure to an upper stop. In the lowered position, when it has been depressed manually, it is held by the latch or locking mechanism. If it is desired to raise the platform, it is depressed slightly, further, against spring pressure, which releases the locking mechanism and, by spring and manual force, the platform is lifted into the operative position against the upper stop. Normally, the upper stop can be made adjustable, so that the working level of the platform can be matched to the requirements of the user.

In undercompensated platforms, a latch is necessary close to the upper edge in order to prevent dropping of the platform from the operating position. If it is desired to lower the platform, then, it is necessary to first slightly raise the platform from the operating positon in order to unlock the locking or latch mechanism, so that the platform can then be lowered, for example together with an appliance or machine. The lowermost position is defined by a lower stop. Of course, the platform must be raised by lifting it with the appliance thereon. Springs can be used to assist the lifting movement but, as noted, with undercompensation, the spring is insufficiently strong to raise the platform without further assistance by an operator.

Various latch mechanisms are known; usually, they can define only a lower position and an upper position of the platform, are relatively complex, and subject to malfunction.

THE INVENTION.

It is an object to provide a latching or locking mechanism which is equally suitable for use with overcompensated and undercompensated platforms and, in general, is suitable for locking in position two relatively movable parts, which is simple, reliable, and permits placing of the parts relative to each other in different respectively adjusted positions.

Briefly, an abutment and stop element is provided, so shaped and arranged that, after release of a locking element, unlimited movement of one part with respect to the other part in either direction is possible. Upon movement of one part in a direction towards the adjustment and stop element, and subsequent movement counter said direction, locking is effected.

Since unlimited movement after unlatching is possible, a plurality of such locking or latching elements can be located along the moving path of the two relatively movable elements so that, for example if a platform is to be latched in position, placement of a plurality of the latching elements can locate the platform at different working levels. Yet, the latching and unlatching, or locking and unlocking operation is simple. In accordance with a feature of the invention, camming elements are used so that no operating levers are needed. In order to release the locking mechanism, and in accordance with the particular arrangement, it is only necessary to slightly lift or slightly depress the platform in order to bring it, then, into a desired position.

In accordance with a preferred feature of the invention, a latching or locking element in form of a lever, for example an angled lever, is used which has a control arm cooperating with a cam curve, and a locking arm. This permits constructing the locking mechanism in a simple arrangement which requires only two parts, preferably made of plastic.

The control arm can cooperate with two cam curves which are so arranged that the first cam curve senses movement in a first direction shortly before reaching a stop or locked position, and thus moves the lever so that the stopping or engagement arm is moved into a latched or locked position, that is, upon reaching the stopped or locked position, engaging with an abutment. Preferably, the locking element is so arranged that, shortly before reaching the abutment position, further movement is inhibited. If the element is made of plastic which has a characteristic that it is slightly deformable, the element can engage a cam curve; the control arm is so associated with the cam curve that the element is slightly deformed and then, when it has reached the end of the cam curve, it will snap back into a released position, thus ensuring that, upon a subsequent movement of the parts in a second direction, the control arm will not engage the cam curve but, rather, another cam curve. This reliably insures sequential engagement of the respective cam curves and reliable functioning of the mechanism, without any additional springs.

The two cam curves can be closely associated with each other; a second cam curve can be so constructed that, upon movement of one part in the second direction, the control arm is moved into a guide track which disengages the movable element so that the stopping arm of the lever will not engage the abutment element. This ensures that movement in the locking direction, after unlocking by counterdirected movement, further locking is inhibited. Consequently, unlimited movement in either direction is possible and placing a plurality of such latches or locks along a moving path permits engagement in a selected one of them, but not requiring latching and locking at each one.

Preferably, the second cam curve is so constructed that, upon continued movement of the first part in the second direction, it presses the control arm against a wall or track portion which deforms the element elastically. Upon release of the control arm, that is, by snap-back of the element after having been deformed, a sudden pulse is generated which snaps the locking element in the locking position. This, then, brings the control arm in a position in which, upon continued movement of the first part in the second direction, further movement is not inhibited even if a further abutment element should be encountered during the movement but movement in the first direction engages the lock.

This arrangement permits placing a plurality of sequentially arranged abutment elements for cooperation with a latching or locking structure, and thus define a plurality of stopping or abutment positions. The last one of the stopping or abutment positions can be a simple stop, and need not be one that can be overridden, since spring pressure can be provided to hold the platform in position against the last one of the stop elements. The last one of the stop elements, for example, may define the level of a platform. For precise adjustment, preferably, the stop elements are adjustably positioned. This can be easily obtained by forming attachment holes at elongated or oval holes or slits so that the stop elements can be precisely adjusted and then screws tightened at the respective position.

DRAWINGS, ILLUSTRATING AN EXAMPLE:

FIG. 3 is a schematic side view of a locking mechanism with two abutment elements subject to be overridden, a top stop, and a locking element for an overcompensated platform;

FIG. 4 is a side view of the locking element of FIG. 3, looked at in the direction of the arrow IV of FIG. 3;

FIG. 5 is an enlarged end view of the abutmentment mechanism of FIG. 3, looked at in the direction of the arrow V of FIG. 3;

FIG. 6 is a fragmentary view of the latching element of FIG. 3, looked at in the direction of the arrow VI of FIG. 3;

FIGS. 7A to 7E are sequential views of the locking element lever in association with the abutment element, and illustrating release of the lock and movement in unlocking direction; and FIGS. 8A to 8G are schematic sequential views of the locking element and abutment element when the locking element is moved into locking position.

Figures 1, 2:
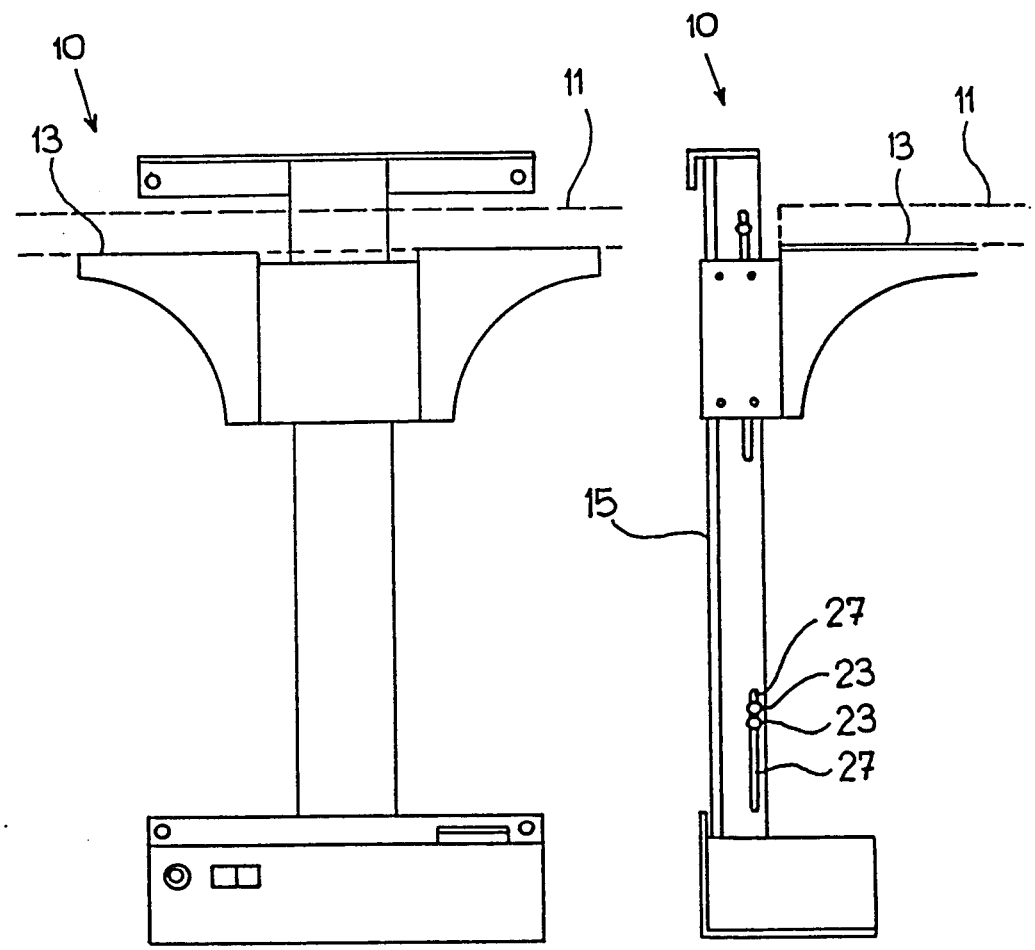
FIG. 1 is a schematic end view of a platform-raising and lowering apparatus, to move the platform relative to a stationary support, for example for a sewing machine, or other apparatus.
FIG. 2 is a side view illustrating guide slits and attachment screws for stop elements of a latching or locking mechanism in accordance with the present invention.

DETAILED DESCRIPTION.

Referring first to FIGS. 1 and 2: A platform, for example a table top 11, is to be positioned in one or more stopped locations above a base support. The platform 11 may, for example, retain a sewing machine thereon, and the entire apparatus can be placed in a sewing machine cabinet. The raising apparatus 10, essentially, has a stationary second part 15 and a movable first part 13 which is relatively movable with respect to the stationary second part 15. Part 13, for example in form of a bracket, carries the plate for platform 11. The raising apparatus itself is described in the referenced application Ser. No. 101,826, filed Sept. 23, 1987, SCHMELLER. The raising apparatus itself may, of course, be differently constructed and does not form part of the present invention. It is only sufficient that, if excess compensation is used for raising the platform 11, the mechanism must be reversed with respect to apparatus which is undercompensated. In the description to follow, it is assumed that the weight of the platform 11 and any appliance placed thereon is overcompensated, that is, the table 11 and any machine thereon is moved by a suitable spring -not visible in the drawings - into the position shown in FIGS. 1 and 2. When in the upper position, a fixed latch 57 (FIG. 3) limits the upper excursion and prevents further upward movement. The upper engagement element, thus, must stop further movement towards the top. If the arrangement is such that the spring undercompensates, a final or bottom stop element must be located at the bottom, and referring to FIG. 3, and elements 19, 21 and 57 must be placed upside down with respect to the illustration of FIG. 3.

The latching or locking mechanism 17 - see FIG. 3 - has at least one abutment and stop element 19 and an engagement and locking element 21. The abutment element 19 is secured with two screws 23 (FIGS. 2, 5) on the second part 15 of the support 10. The engagement element 21 is a double lever which is pivotable about a pivot axis 25, and secured to the first part 13 of the apparatus 10. The first part 13 is height-adjustable with respect to the second part 15 - see also FIGS. 1 and 2. It is, of course, for the operation of the locking mechanism, irrelevant if the first part 13 or the second part 15 is movable, or if both parts are movable with respect to a base or reference or support; it is of importance, only, that the first and second parts 13, 15 can move relative to each other along a guide path or guide line which, as shown, is straight and vertical, although this is not necessary. The engagement or relative movement path can be curved; if the curve has portions of relatively small radius of curvature, the abutment element 12 as well as the locking element 21 must be suitably constructed to match the curve. As best seen in FIGS. 2 and 5, the abutment element 19 can be adjusted along an elongated slit 27 so that the abutment element 19 can be placed in a desired position and adjusted at a selected level, that is, in the example shown, can be shifted upwardly or downwardly.

The engagement element 21 is a lever and, in the embodiment shown, an angled lever, which has two arms. The angled lever has a stopping or locking arm 31 and a control arm 33. Control arm 33 carries a pin 35 which projects laterally (see FIG. 6) to cooperate with curves or cams and guide tracks on the abutment element 19, as will appear. The engagement element 21, preferably, is a unitary element of plastic, for example nylon. The abutment and stop element 19, likewise, preferably is made of a single plastic element, preferably also nylon. The characteristics of the plastic of the abutment element should be such that it is somewhat elastically deformable. The abutment element 19 is an elongated structure which, on the side at which a stop or abutment shoulder 37 is placed, has two threaded holes 39, for attachment by the screws 23 to part 15. The surface 41 of the structure 19 is slightly inclined with respect to the remaining surface 43 of the structure 19, so that a small gap 45 will form between the attachment or second part 15 of the support structure 10 and the base surface 43 of the part 19. If a force is applied against the end cam surface 47, the element 19 can deform elastically so that the gap 45 will close, in other words, the lower portion (FIG. 3) of the element 19 can tilt or tip towards the support 15. Reversely, a force applied against the curve 49 of the element 19 can deform the element 19 so that it is pulled towards the right (FIG. 3), causing the gap 45 to increase. A guide track or groove 51 is formed in the abutment or stop element 19 which has a conical enlargement towards the abutment shoulder or stop 37. A cam track groove 51' is located at the other end of groove 51 and defines a cam surface 49. A curve 55 is formed on the forward or upper part of the element 19, that is, in the region of its attachment to the support 15 by the screws 23.

FIG. 3 illustrates two abutment elements 19, which define different raised or stopping or latching positions. Additionally, a top stop 57 is provided which is constructed in usual and customary form. Of course, it is also possible to utilize one of the elements 19 instead of the upper stop 57 and more than two elements 19 may be located, vertically, along any support.

OPERATION, WITH REFERENCE TO FIGS. 7 AND 8:

RELEASE OR UNLATCHING OF AN OVERCOMPENSATED FIRST PART 13, FIGS. 7A TO 7E:

The arrows UP and DN next to or on the engagement element 21 illustrate its movement. A fragmentary showing of the first part 13 has been omitted from FIGS. 7B through 7E for clarity.

Locking element 21, by connection of its pivot 25 to part 13, moves vertically without essentially any sideways escape.

FIG. 7A illustrates the - overcompensated - element 13 retained in latched position, in which arm 31 of the engagement element 21 is locked against the abutment shoulder 37 of the abutment and stop element 19. The overcompensating force is schematically shown by arrow F. The stopping or locking arm 31 is in engagement with a locking shoulder 37 and the pin 35 on the control arm 33 is close to the cam curve 49 in track groove 51'.

To release the lock or latch, a short movement downwardly by a push counter force F is applied on the first element 13, which will move the pivot 25 downwardly, see arrow DN, FIG. 7B. This causes tilting of the locking element 21 in the direction of the arrow 70B. The locking arm 31 of the engagement element 21 is thus tilted out of position with respect to the locking shoulder 37 and, upon subsequent upward movement under force F - see arrow UP, FIG. 7C - pin 35 will ride in groove 51 and the locking arm 31 can pass freely by the abutment shoulder 37. Upon further movement upwardly, see FIG. 7D, the engagement element 21 is tipped in the direction of the arrow 70D counter the direction of arrow 70B to again reach the abutment position which the engagement and locking element 21 had in FIG. 7A. Upon further upward movement, thus, the locking arm 31 will engage the fixed stop 57 (FIG. 7E) which will limit upward movement. If the upper stop should be an element similar to abutment element 19, it will lock therein, as will be explained below.

LOCKING OR LATCHING OF ENGAGEMENT AND LOCKING ELEMENT 21, FIGS. 8A-8G:

FIG. 8A corresponds to FIG. 7E; FIG. 8G corresponds to FIG. 7A.

For simplicity, upward movement, arrow UP, can be referred to as movement, arrow DN, in a "first" direction, and, then, downward movement as the "second" direction.

Upon downward movement, schematically shown by arrow DN, of element 13 - omitted from FIGS. 8B to 8G for clarity - the stopping or locking arm 31 will engage the third cam curve 55 on the upper surface of the abutment element 19. This rotates the engagement element 21 in clockwise direction, see arrow 80B, so that the pin 35 reliably enters the conical enlargement 53 at the end of guide track 51. Upon further downward movement, see FIG. 8C, the pin 35 is guided in the guide track 51 until it engages the second cam curve 49. Cam curve 49 further rotates the engagement element 21 in clockwise direction. The end portion 33a of the control arm engages the part 15 which inhibits further rotary movement of the engagement element 21, but now causes deformation of the somewhat elastic abutment and stop element 19 and increase of the gap 45 by continued engagement of the pin 35 with the second cam 49 as the pivot 25 continues to move downwardly. Thus, end portion 33a slides downwardly on surface 15a of the support 15 as the pivot 25 moves downwardly, see FIG. 8D. When the control arm 33 has reached the end of the cam curve 49, the elastic or resilient abutment and stop elements snaps back abruptly into an untensioned, released position, which transfers a sharp pulse to the engagement element 21, kicking or snapping the element 21 in counterclockwise direction, thereby moving the locking arm 31 in locking position, as shown in FIG. 8E. The snap-back movement of the element 19 is shown in FIG. 8E by arrow 190E, and the outward tilting movement of the abutment element 21 by arrow 210E.

Continued downward movement is now possible.

To latch the first part 13 at the position of the stop element 19 shown in FIGS. 8E and 8F, it is merely necessary to permit upward movement of element 13, and hence of the engagement and locking element 21, as shown by the upwardly directed arrow UP from pivot axis 25 in FIG. 8F. Upon such upward movement of the engagement element 21, the stopping or locking arm 31 thereof will engage the upward portion of the second part or support 15, thus limiting further tilting movement. Pin 35 engages the abutment element 19 on the first cam curve 47, tending to press the abutment element 19 against the support 15, see arrow 290F, to decrease, or entirely eliminate the gap 45, as seen in FIG. 8F. When the control arm 33 has reached the end of the first cam curve 47, the abutment element 19 again snaps back, resiliently, see arrow 290G, in its unstressed, untensioned position as shown in FIG. 8G. In this position, the pin 35 will be close to the second cam curve 49. This ensures that, (a) the engagement element 21 can be brought into engagement of the end 31 with notch 37, if part 13 continues to be moved upwardly (FIGS. 8G and 7A), or (b) The engagement element 21 can be brought then out of engaged position if the first part 13 is moved downwardly counter force F with pin 35 in the track 51' next to cam 49 (FIG. 7B).

As described above, the pin 35, when in track 51', will again engage the second cam curve 49 - see description with respect to FIG. 7B. It must be recalled that locking element 21 is secured to first part 13 at pivot 25 and constrained to move only vertically without, effectively, lateral escape.

Let it be assumed that the abutment and stop element 19, as illustrated in the position of FIG. 8E, corresponds to the uppermost element of FIG. 3, then it can be easily seen that further downward movement can be obtained from the position of FIG. 8E, up to the lowest abutment element 19 of FIG. 3. At that point, the movement would result which is described with respect to FIGS. 8B and 8G. This ensures that the locking mechanism can be used at a plurality of positions by placing one engagement and locking element 21 on the first part 13 and a plurality of abutment and stop elements 19 on the second part 15, thereby permitting arresting the table 11 at a plurality of vertically spaced positions.

The direction of relative movement is not necessarily vertical. No special springs are needed and the pivoting movement of element 21 can be controlled, entirely, by the cams and camming surfaces 47, 49, 55, 51, 51' on the abutment and stop element 19, assisted, preferably, by resilient movement thereof.

Various changes and modifications may be made within the scope of the inventive concept.

I claim:

1. Movement-controlled locking or latching mechanism for releasably locking a first part (13) of a device (10) with respect to a second part (15) thereof,
   in which, upon movement of one (13) of the parts in a first direction (UP) relative to the other (15) of the parts, movement is inhibited at a predetermined stopping position on the device (10), said mechanism comprising
   at least one abutment and stop element (19) secured to the other (15) of the parts for defining at least one stopping position;
   an engagement and locking element (21) secured to said one of the parts (13), and operatively engageable with said abutment and stop element to stop movement of said one of the parts upon movement thereof in said first direction (UP) while permitting, subsequent to release of the locking element from said abutment and stop element (19), unlimited movement of said one of the parts (13) with respect to the other part (15) in both the first direction and in a second direction, opposite to said first direction,
   wherein said engagement and locking element (21) comprises a pivotable lever (21) pivotably coupled to said one part (13),
   said pivotable lever having a stopping or locking arm (31) and a control arm (33),
   said pivotable lever being operatively engageable with said abutment and stop element (19) to stop movement of the one (13) of the parts upon movement thereof in said first direction (UP) while permitting release of said one of the parts upon movement in said second direction (DN) by a predetermined distance, and then permitting unobstructed movement of said one part (13) in said first direction (UP) past said abutment or stop element (19) or, selectively, continued movement in said second direction (DN);
   wherein said abutment and stop element (19) includes
   a first camming means (55);
   a second camming means (51);
   a third camming means (47); and
   a fourth camming means (51', 49);
   a first cam engagement means (31) located on said locking arm (31) of the engagement and locking element (21);
   a second cam engagement means (35) located on said control arm (33) of the engagement and locking element (21);
   wherein the first camming means (55) is located to engage the first cam engagement means (31) when the one of the parts (13) is moved in said second direction (DN) to pivot the engagement and locking element (21) in position for engagement of the second cam engagement means (35) with the second camming means (51);
   wherein said second camming means (51), upon engagement of said second cam engagement means therewith, pivots said engagement and locking element (21) in position to place said stopping or locking arm out of engagement with said abutment or stop element (19);
   the third camming means (47), upon movement of the engagement and locking element (21) in said first (UP) direction after prior movement in said second direction (DN) by said predetermined distance, pivoting the control arm (33) of the engagement and locking element (21) into position in which the stopping or locking arm (31) thereof comes in engagement with a stop abutment (37) on said abutment and stop element (19); and
   wherein the fourth camming means (51', 49) engages said control arm (33) of the engagement and locking element (21) upon movement in said second direction (DN) for release of said stopping or locking arm (31) of the engagement and locking element (21) from said stop abutment (37) of the abutment and stop element (19).

2. The mechanism of claim 1, wherein said lever is an angled lever (2).

3. The mechanism of claim 1, wherein at least one of said camming means defines camming surfaces (47, 49, 55) formed on said abutment and stop element (19).

4. The mechanism of claim 1, wherein the abutment and stop element (19) comprises resilient material, and wherein the engagement and locking element (21), upon movement in the first direction (UP) and engagement of the control arm (33) with the third camming means (47), the control arm elastically deforms the abutment and stop element (19) and, when the control arm (33) reaches the end portion of the third camming means (47), the control arm is released from the third camming means and the abutment and stop element (19) snaps back to a rest position, thereby ensuring that, upon subsequent movement of the first part (13) in the second direction (DN), the control arm (33) will be released from engagement with said third camming means (47) and placed in position for engagement with the fourth camming means (49, 51') formed on the abutment and stop element (19).

5. The mechanism of claim 1, wherein the abutment and stop element (19) comprises resilient material, and wherein said fourth camming means (49) has a cam end portion which is resiliently movable and biassed against said control arm (33) of the engagement and locking element (21) so that, upon movement of the control arm along the length of the fourth camming means (49), an end portion of the fourth camming means becomes resiliently deflected and, upon disengagement of the control arm (33) from the cam end portion of the fourth camming means (49), the abutment and stop element (19) will resiliently snap into a rest position and thereby move the control arm (33) in the path of the third camming means (47).

6. The mechanism of claim 5, further including a guide track (15a) on said other part (15) and in the path of relative movement of said two parts;
guide track engagement means (33a) formed on the control arm (33) of the engagement and locking element (21);
and wherein the fourth camming means is adapted to provide for resilient deflection of said cam end portion upon engagement of said engagement means (33a) on the control arm (33) of the engagement and locking element (21) with said guide track (15a) to resiliently move the abutment and stop element (19) away from said guide track, but permit snap-back, resiliently, of said abutment and stop element (19) when the engagement and locking element (21) has moved to a position out of engagement with said fourth camming means (49).

7. The mechanism of claim 6, wherein said fourth camming means (49) is shaped to guide the control arm (33a) of the engagement and locking element (21) into a guide track surface (51) formed by said second camming means on the engagement and locking element (21);
and wherein said guide track surface (51) guides the control arm (33) to move said engagement and locking element lever (21) in a direction in which the stopping or locking arm (31) clears the stop abutment (37) upon continued movement of said first part (13) in said first direction (UP).

8. The mechanism of claim 1, wherein the abutment and stop element (19) comprises a plastic molded element of a material which is resiliently deformable or deflectable.

9. The mechanism of claim 8, wherein said abutment and stop element (19) material comprises nylon; and
said abutment and stop element is an elongated structure secured at one end to said other part (15) and having a second and free end which is spaced from said other part (15) by a small gap (45) defining a rest position, and resiliently deflectable towards and away from said other part to close or increase said gap and, after deflection, suddenly and with a snap-back movement, returning to a rest position.

10. The mechanism of claim 1, wherein said other part (15) is elongated, and a plurality of abutment and stopping elements (19) are secured thereto, longitudinally staggered along said other part.

11. The mechanism of claim 1, further including a fixed stop element (57) secured to said other part and permitting movement of said one part (13) away from said stop element in one direction only.

12. The mechanism of claim 1, wherein said abutment and stop element (19) is adjustably positioned on said other part (15).

13. The mechanism of claim 1, wherein said abutment and stop element (19) is an elongated structure;
said second camming means (57) includes a guide track surface (51) extending essentially longitudinally thereof;
the third and fourth camming means (47, 49) being positioned close to an end portion of said guide track surface (51) and located at an end portion of said elongated structure,
the third camming means (47) being located adjacent the terminal end of said structure and extending from a position adjacent said other part (15) to a free surface of the elongated structure, and out of communication with said guide track surface (51);
the third camming means (49), in communication with said guide track surface (51), extending from a position adjacent said other part (15) to a terminal surface of said elongated structure, and meeting said fourth camming surface (47);
the first camming means (55) being located adjacent the other end of said elongated structure;
the abutment stop (37) being formed in said elongated structure, adjacent a junction of said guide track surface (51) and said first camming means (55);
and wherein said engagement and locking element comprises an angled lever (21),
the control arm thereof being selectively engageable with said first and fourth camming means (47, 49) and said guide track surface (51) and
a stopping or locking arm (31) selectively engageable with said first camming surface (55) and said abutment stop (37), respective engagement of said arms (31, 33) of said engagement and locking element (21) causing tilting or pivoting of said angled lever in dependence of the direction of movement of said first part (13) with respect to said second part (15) and therefore effect selective engagement of the stopping or locking arm (31) with the abutment stop (37) on the abutment and stop element (19) or clearing of the stopping and locking arm (31) from said abutment stop.

14. The mechanism of claim 1, wherein said lever is an angled lever, having a pivot point connected to said one part (13), and said two arms (31, 33) facing said abutment and stop element (19).

15. In combination with a movable platform or table (11), a support (15) extending essentially vertically, on which said movable table or platform (11) is vertically slidable, the movement-controlled locking mechanism claimed in claim 1, wherein said table or platform comprises said first part (13) to which the engagement and locking element (21) is secured and said vertical support (15) comprises the other part (15).

16. The combination of claim 1, wherein a plurality of adjustment and stop elements (19) are secured to the vertical support (15) located longitudinally staggered thereon.

17. In combination with a movable platform or table (11), a support (15) extending essentially vertically, on which said movable table or platform (11) is vertically slidable, the movement-controlled locking mechanism claimed in claim 13, wherein said table or platform comprises said first part (13) to which the engagement and locking element (21) is secured and said vertical support (15) comprises the other part (15).

* * * * *